US005907288A

United States Patent [19]

Clark et al.

[11] Patent Number: 5,907,288

[45] Date of Patent: May 25, 1999

[54] ACCESS CODE PROCESSING FOR A SECURITY SYSTEM

[76] Inventors: David P. Clark, 97 Gill Bank Dr., Aurora, Ontario, Canada, L4G 5E2; Alan J. Bowering, 31 Croteau Crescent, Thornhill, Ontario, Canada, L4J 5S7

[21] Appl. No.: 08/857,074

[22] Filed: May 15, 1997

[51] Int. Cl.[6] .................................................. G06F 7/04

[52] U.S. Cl. ............................... 340/825.31; 340/825.34; 340/541; 380/23

[58] Field of Search ......................... 340/825.31, 825.32, 340/825.34, 149, 541; 235/382.5, 382, 380, 487; 380/23; 341/35; 361/172; 365/189.05; 70/278, 333 R; 400/54, 62, 83, 368

[56] References Cited

U.S. PATENT DOCUMENTS 3,866,173 2/1975 Moorman et al. ...................... 340/149

4,804,278 2/1989 Gotou et al. .............................. 400/54

4,931,769 6/1990 Phillips et al. .......................... 340/541

*Primary Examiner*—Michael Horabik

*Assistant Examiner*—Jean B. Jeanglaude

[57] ABSTRACT

A security system includes a control panel for controlling the operation of the security system and a keypad for communication with the control panel by entry of access codes by key-presses of keys on the keypad of the keypad controller. The control panel includes a means for examining a sequence of key-presses for a match between a first defined number of consecutive key-presses and access codes programmed in the control panel. The control panel examines the sequence of key-presses after a second defined number of key-presses and if no match is found, continues to examine the most recent first defined number of key-presses after each further individual key-press until a match is found.

18 Claims, 3 Drawing Sheets

ACCESS CODE PROCESSING FOR A SECURITY SYSTEM

FIELD OF THE INVENTION

The present invention relates to a security system and in particular, to a security system having an access code processing capability for reducing the possibility of incorrect code entries.

BACKGROUND OF THE INVENTION

Security systems are becoming widespread in use with most commercial establishments and many residential establishments having security systems installed. Such security systems generally include a control panel which controls the overall operation of the system, one or more keypad controllers for user access to the system and various detectors and sensors. The control panel is generally mounted in an area of restricted access, such as a utility room or basement, and contains the system electronics, back-up power sources, and includes an interface for remote monitoring and two way communication over telephone lines or other systems. Security systems are generally divided into several zones or areas of protection and each of these zones generally has one or more detection devices or sensors such as motion detectors, door or window contacts, glass break detectors, or shock sensors connected to it. In some security systems, smoke detectors or other fire detection devices may also be connected to the control panel.

Security systems generally have one or more means for a user to access the system, such as, keypad controllers which are used by the user to instruct the security system. The keypad controller is used to send commands to the system to control the operation of the system and may also display system information. Such keypad controllers generally have a status display which may include either individual indicators, such as light emitting diodes or may include a LCD or LED display, which is capable of displaying a number of alpha-numeric characters used to display simple messages regarding the status and operation of the system. Recently, graphical controllers have also been proposed having a graphical display screen capable of displaying a floor plan of the premises at which the security system is installed.

The keypad controller is also used by the user to arm and disarm the security system. Each user of a security system is given a unique personal identification number or PIN, which is generally a sequence of numbers which are entered by the user, in order, on the numeric keypad. When arming the system, the user enters their PIN at which time the system will be armed and will generally provide a delay time to enable the user to exit the premises at which the system is located before the system becomes fully armed. Upon entering a premise having an armed security system, the user would enter their PIN at which time the security system would be disarmed. During disarming of the security system, there is generally a delay time to enable the user to enter their PIN before the system will go into alarm mode.

The security system is generally set up to permit a number of attempts of entry of the PIN by a user. This is so that, should a user incorrectly enter their PIN, they will be given another opportunity to enter the PIN correctly. This situation may arise where the user has either pressed a wrong number key in the sequence of their PIN, has entered a number in the sequence twice, or has inadvertently skipped entering a number in the sequence. While a number of security systems give an audible feedback by sounding a tone with each key-press, in some situations, the user may not be able to hear the tone clearly, and thus, may enter the PIN incorrectly. At the present time, a number of such security systems examine the number sequence of the PIN in a block. Thus, for example, if the PIN is a sequence of four numbers, the security system will examine the first four numbers entered to determine whether a match exists against the authorized access codes programmed in its memory. If no match is found, then the security system will wait for the next four numbers to be entered and repeat the matching of those numbers. A number of security systems also provide the capability of clearing the numbers entered if the user has realized they have made a mistake during the entry of the number sequence. Thus, the user may clear the numbers and start again at the beginning. In order to maintain the integrity of the security system, the security systems are generally programmed to allow a limited number of attempts for the PIN entry before the security system will lock-out the keypad and not permit any further attempts.

While the above types of security systems do provide for some flexibility in the event that a user incorrectly enters their PIN, there are some circumstances in which the user may be continually entering the wrong PIN and would not be aware of that situation. This circumstance could arise if the user has double entered a number or has skipped a number. In these circumstances, the block of numbers being examined by the security system for a valid access code would be shifted and even if the user were entering the correct PIN on the second or third attempt, because of this shift of the number key examination, no valid match with a PIN would be identified. There thus, remains a need for a security system which will overcome these difficulties.

SUMMARY OF THE INVENTION

The present invention is directed to a security system comprising a control panel for controlling the operation of the security system and a keypad for communication with the control panel by entry of access codes by key-presses of keys on the keypad. The control panel includes a means for examining a sequence of key-presses for a match between a first defined number of consecutive key-presses and access codes programmed in the control panel. The control panel examines the sequence of key-presses after an initial second defined number of key-presses and if no match is found, continues to examine the most recent first defined number of key-presses after each further individual key-press until a match is found.

In an aspect of the invention, there is provided a method for examining a sequence of key-presses from a keypad of a security system to match a first defined member of consecutive key-presses with access codes programmed in a control panel of the security system, the method comprising:

- waiting until a second defined number of key-presses are entered;
- examining the initial defined number of consecutive key-presses for a match with an access code;
- if no match is found and a new key-press is entered, examining the most recent defined number of consecutive key-presses for a match;
- continuing to examine the most recent defined number of consecutive keystrokes for a match after every new key-press until a match has been identified.

BRIEF DESCRIPTION OF THE DRAWINGS

A preferred embodiment of the present invention is illustrated in the attached drawings, wherein.

DETAILED DESCRIPTION OF THE PREFERRED EMBODIMENTS

Figure 1:
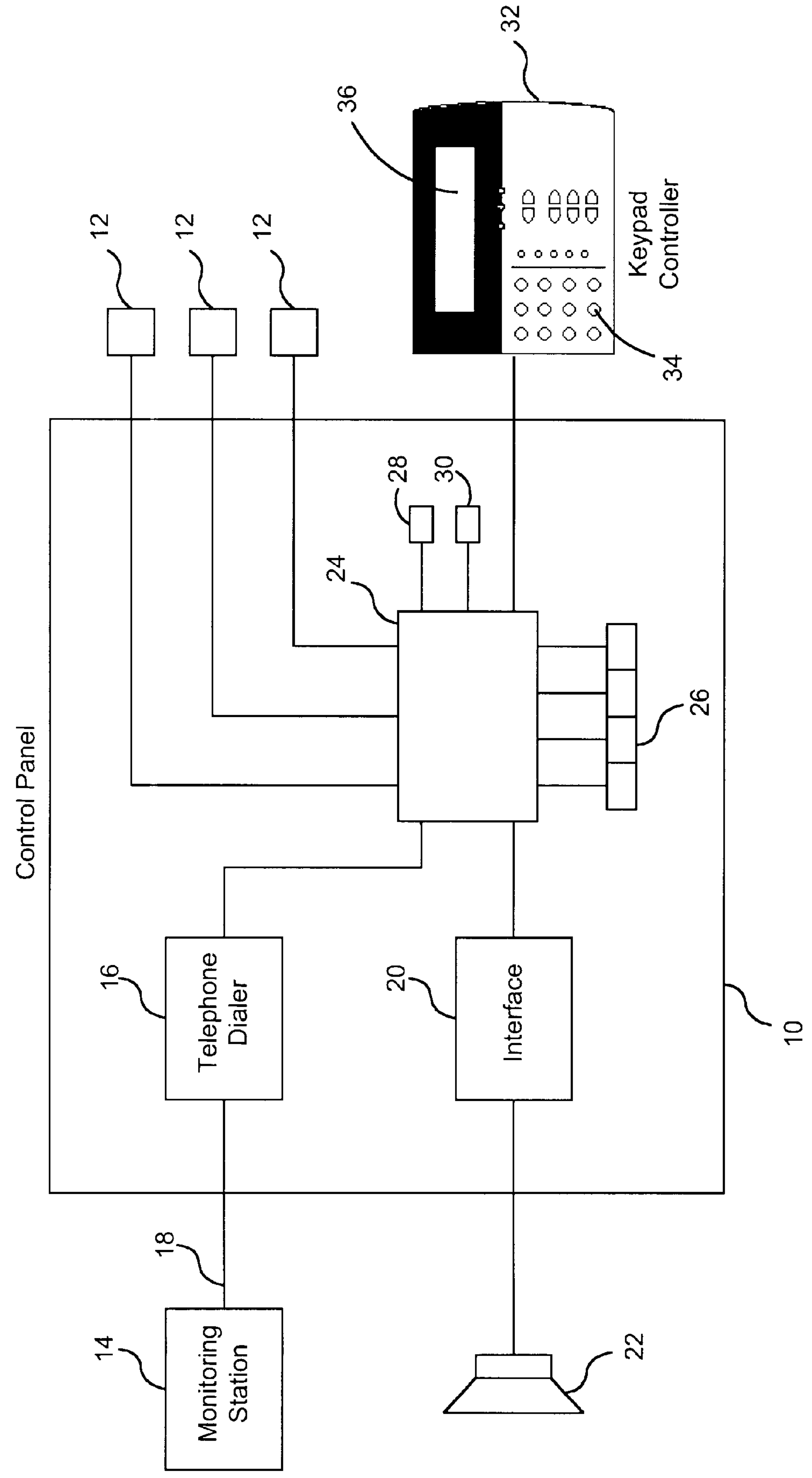
FIG. 1 is a block schematic view of a preferred embodiment of the security system according to the present invention.

A typical security system embodying the present invention is illustrated in FIG. 1. Security system comprises a control panel 10 which controls the operation of the overall security system. A number of detection devices 12, utilized for monitoring a zone or area of protection, are connected to the control panel in a typical manner. Detection devices 12 may be any of the commonly utilized detection devices such as motion detectors, door contacts, glass break detectors, shock sensors, fire detectors, water detectors, etc. The detection devices 12 in FIG. 1 are shown hard wired to the control panel 10, however, wireless technology is in common use and any of the detection devices 12 could use wireless communication between the detection devices 12 and the control panel 10. The security system may be capable of reporting to a remote monitoring station 14, utilizing any of the commonly employed methods of communication such as utilizing a telephone dialer 16 sending messages to the remote monitoring station 14 using local telephone systems 18. In some situations, the connection between the control panel 10 and the remote monitoring location 14 may also be wireless, utilizing cellular telephone technology or other means of wireless communication. The system can also use other communication arrangements such as two way cable systems. The control panel also includes an interface 20 for connection to a sounding device 22 for activation in an alarm or emergency situation.

The control panel 10 includes a logic and programming module 24 which controls the overall operation of the system. Shift registers 26 are provided for storing the digits entered through the keypad, as will be explained further below. In the preferred embodiment, the security system control panel 10, also includes two counters, a digit counter 28 and a keypad lock-out counter 30, the operation of which will also be explained further below.

A means for allowing the user to interact with the security system is also connected to the control panel. Many such means are presently in use including keypads specific to security systems, which may be hardwired to the control panel or may communicate with the control panel using suitable wireless technology. Security systems may also allow a user to interact with the control panel using a telephone through which the user can enter access codes using the keypad on the telephone set. Other means of allowing a user to access the security system are also known and any of these means can be used with the security system of the present invention. As shown in the figure, in a preferred embodiment, a keypad controller 32 is connected to the control panel 10 for allowing the user to interface with the security system, to program the system and control the operation of the system and for displaying the status of the system and its various components. As noted above the keypad controller 32 can be replaced by any suitable means for allowing a user to interact with and in particular enter access codes for the security system. The keypad controller 32 is provided with a numeric keypad having individual keys 34 and a status indicating means for providing feedback to a user on the status of the system. The status indicating means can be any of the commonly employed means to provide audio or visual feed back. For example, the status indicating means can be a means of providing audio feedback by providing a speaker to play back prerecorded messages or system generated messages corresponding to the status of the system. Alternatively, the status indicating means can provide visual feedback through the use of indicator lights, LCD or LED displays capable of displaying alpha-numeric characters or displays capable of displaying graphical images. In the embodiment illustrated in FIG. 1, the keypad controller 32 is provided with a LCD or LED display area 36 for visual display of system messages and feedback during key entry on the keypad, although as noted above, other status indicating means may be employed.

In operation, the security system is programmed by the installer and/or user with various access codes, such as, for example, a duress code for activation of the system in an emergency situation, an installer's code and master code for programming of the security system, and user codes, utilized by users when arming and disarming the security system. When a user is arming or disarming the security system, they will key in their access code by pressing the number keys 34 in the proper sequence corresponding to their access code. The most commonly utilized access codes are those four digits in length, although access codes of fewer or greater digits such as for example 2, 3 or 6 are also used.

In the prior art security system, the security system control panel examined the keystrokes in blocks corresponding to the number of digits in the access code. Thus, the control panel would examine the first four keystrokes and attempt to match those keystrokes against an access code. If there was no match, then the system would examine the fifth through eighth keystrokes in an attempt to match those to the access code. Prior art security systems would generally permit three or four such blocks of digits to be entered before the control panel would lockout the keypad. Keypad lock-out would sound an error tone at the keypad and would disable the keypad from entry of any key-presses for a specified period of time, which can be set at the time the system is installed. Generally, keypad lockout may last for anywhere from minutes to hours, typically for a period from 10 minutes to as much as 4 hours depending upon the requirements of the installation.

The operation of the preferred embodiment of the security system of the present invention will now be explained with reference to FIG. 2. In the base mode, the control panel 10 is waiting for a key-press on the keypad controller 32. When a new key-press has come in and the system is in the base mode, the logic circuitry 24 clears the key-press digit counter 28 and checks whether keypad lock-out is active. If keypad lock-out is active, an error tone is sounded and the system returns to the base mode waiting for a key-press. So long as the keypad lockout is active, no key-presses will be passed through. If keypad lock-out is not active, the key-press is first examined as to whether it is a valid key-press, specifically a digit from 0 to 9. If it is not a valid key-press, then the system returns to the base mode, waiting for a valid key-press. If the key-press is valid, a digit is loaded into the first of the shift registers 26 and the system then waits for the next key-press to come in. The system will generally wait for a specified period of time for the next key-press to be entered. If no key-press is entered within the specified time, which is typically on the order of from about 30 seconds to about 2 minutes, the system returns to base mode and clears the shift register 26, keypad lockout counter 30 and digit counter 28. When the system receives a valid key-press, the digit is loaded into the shift register and the system waits for the next key-press. This is continued until a second defined number of key-presses, corresponding to the length of the access code, have been entered and loaded into the shift register 26.

Once the number of initial valid key-presses matches the length of the access code, the digits in the shift register 26 are matched against the programmed codes. If a valid match is obtained, the keypad lock-out counter 30 is cleared and the system continues through its normal operation. If there is no match for any of the programmed codes, then, as shown in FIG. 2*b*, the system determines whether this is the first code entered and checks whether enough digits have been entered to increment the keypad lock-out. Keypad lock-out is incremented every time a block of digits corresponding to the number of digits in the access code is entered. Thus, if this is the first four digits being entered, then the keypad lock-out counter 30 is incremented by one, the digit counter is cleared and the system waits for the next key-press to come in. At this time, the system increments the digit counter by one, bumps the oldest digit out of the shift register 26, and moves all the other digits ahead one position in the shift register 26. When a new key-press is entered, if it is a valid key-press, then the system determines whether the four digits in the shift register 26 match a programmed code. If the four digits in the shift register 26 do not match a programmed code, then the digit counter 28 is incremented again, and the cycle is repeated until either a valid code match is obtained, or the digit counter 28 matches the number of digits in an access code. When this takes place, the digit counter 28 is cleared and the lockout counter 30 is advanced by one. If the lock-out counter 30 reaches its pre-programmed number before a valid code is entered, then the control panel 10 initiates the keypad lock-out, sounding the error tone and locking out the keypad for the specified period.

Figure 2A:
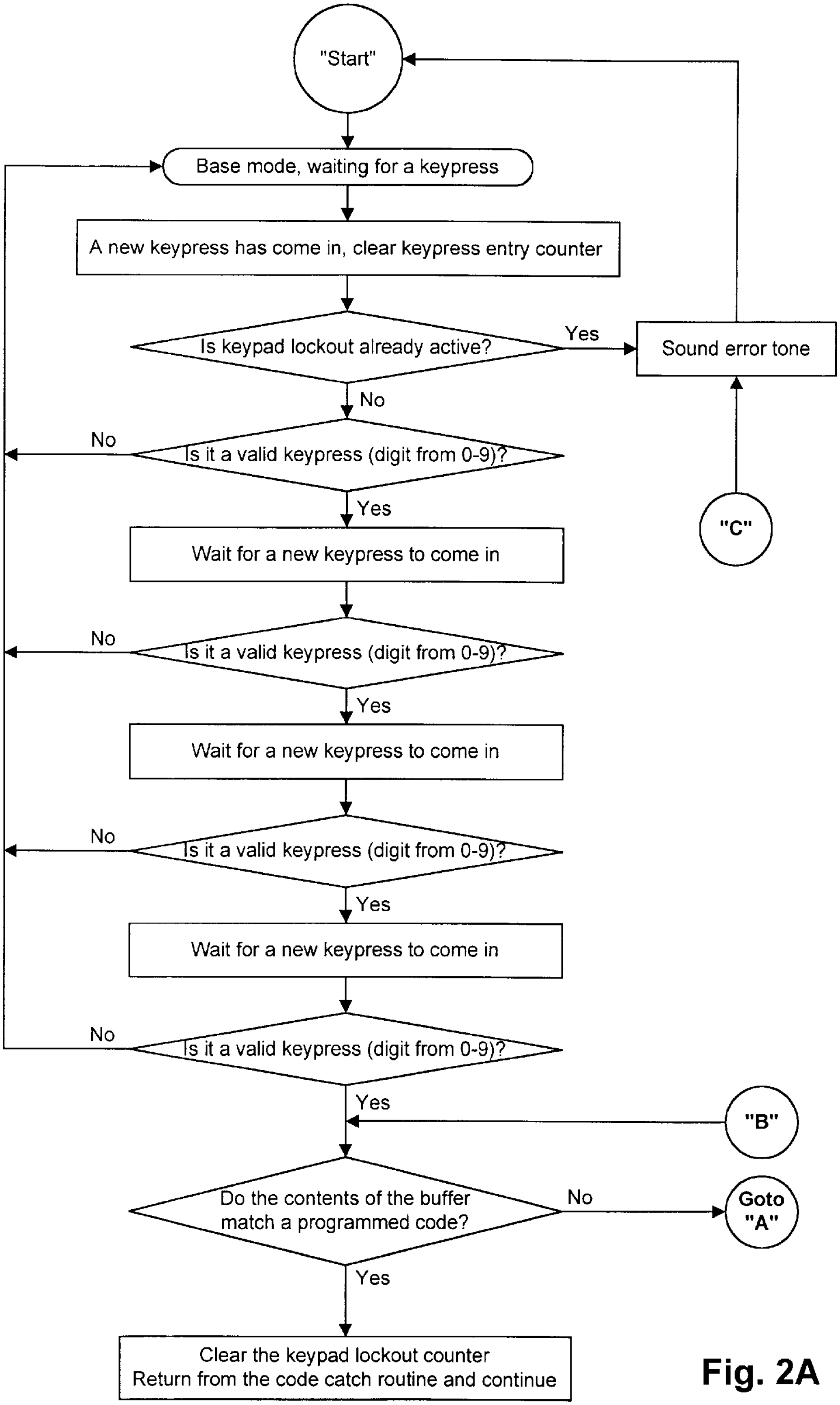
FIG. 2 is a flow chart of the operation of the security system of FIG. 1.
Figure 2B:
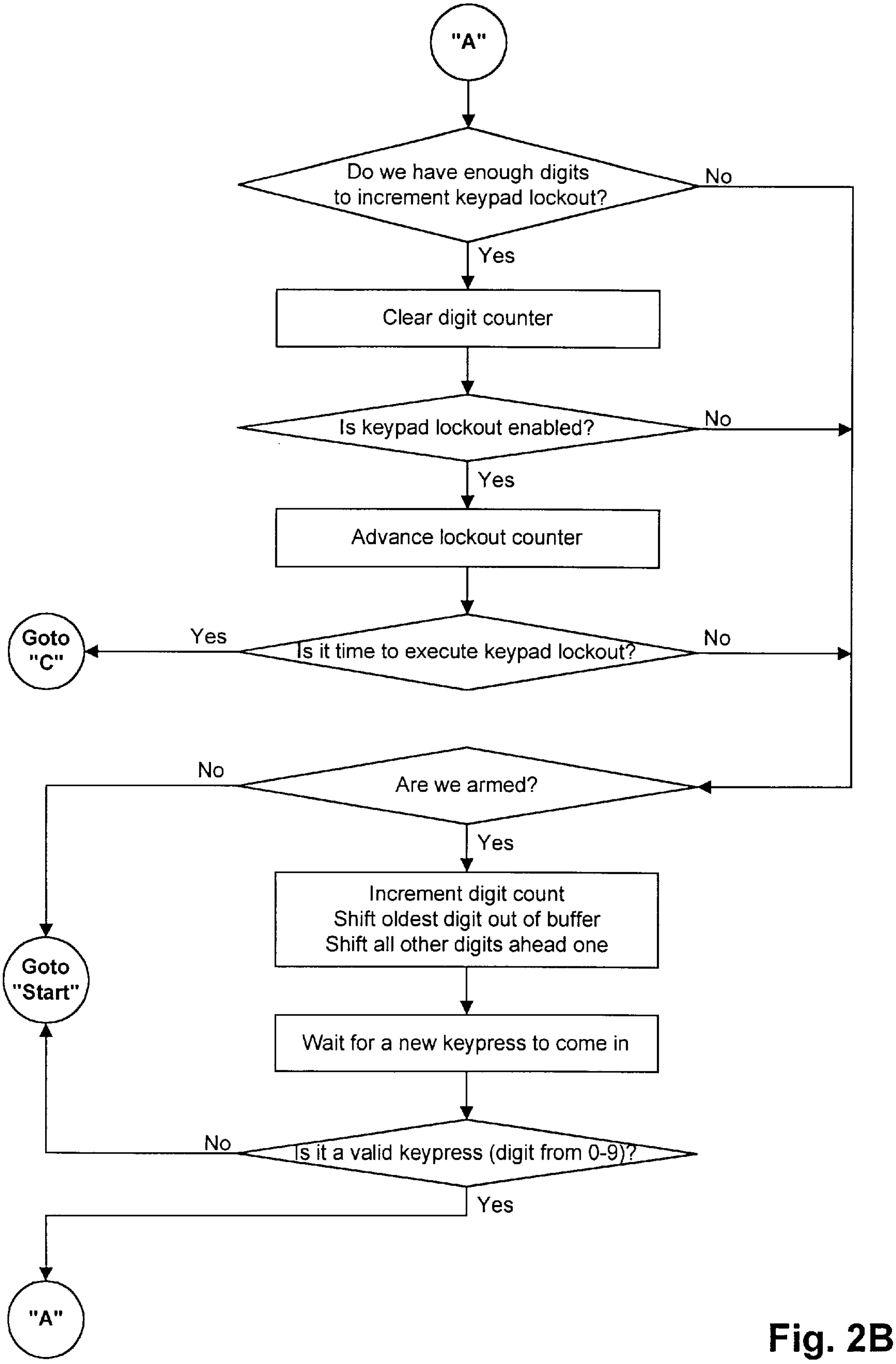

The flow chart in FIG. 2 illustrates the operation of the security system with respect to examining key-presses for digit keys. Many security systems also utilize special keys for specifying the type of code to be enabled, for example, the duress code, installer's code or master code, the entry of these codes instructing the logic to perform specific functions in the normal manner, and this is not illustrated in the flow chart.

In addition, most security systems utilize a special key to enable a user to clear the key-press buffer if they have realized that they have made an error during the entry of their access code. Pressing this special key enables a user to commence entry of the code again from the beginning. With the security system of the present invention pressing the special key clears both the keystroke shift register 26 and the digit counter 28 so that the system would start again at the base mode waiting for a key-press as shown at the beginning of FIG. 2.

While the preferred embodiment of the security system of the present invention has been described as having two counters, the digit counter 28 and the keypad lockout counter 30, these are not essential to operation of the system in general. The use of the keypad lockout feature is optional although it is preferred. If keypad lockout is not used, then the system does not require the two counters, and the system would compare each defined sequence of the most recent digits for a match. If no match is found the systemn would wait for a new key-press and continue to examine the most recent defined number of key-presses until a match is found.

The preferred embodiment, as described above, waits until the user has entered an initial number of key-presses matching the length of the access code before examining the digits in the shift register 36 against the access code. In order to simplify the system and, in particular, the programming of the logic module, the system could be set up to examine for a match on every key-press, i.e. the second defined number of key-presses would be 1. No valid match would be expected in this configuration until at least the number of key-presses is the same as the length of the access code. As the system would not have to know when the initial number of key-presses has equaled the length of the access code, the programming could be simplified.

If keypad lockout is desired, it could also be accomplished using only one counter, the digit counter 28. In this configuration, the digit counter would be incremented by one each time a valid key-press is detected. The digit counter 28 would not be cleared after each set of defined number of digits but would keep track of the total number of key-presses entered. Once a defined number of total key-presses has been entered, i.e. once the digit counter has reached a predetermined number, without a match being found with a valid access code, then the system would activate keypad lockout.

While the security system of the present invention could utilize the method and apparatus for examining each key-press for a valid code match on both arming and disarming of the security system, it is preferred if the individual key-presses are examined only on disarming. With the method of the present invention, if the key pad lockout counter is active after 4 attempts and there are 4 digits in an access code, the system will examine 13 possible combinations of digits for a match with an access code. If the system were to allow this on arming, then it would be possible for a person to enter codes at random, if they are not successful, wait until keypad lockout has expired, and enter a new series of codes. Thus it is preferred if the security system utilizes block examination for access code match for arming of the system and only utilizes key-press examination for disarming preferably during entry delay.

The security system of the present invention helps to reduce problems with users entering access codes incorrectly, especially in an alarm or an emergency situation and particularly when the user has either inadvertently double entered a digit or has missed entering a digit in their access code. Typically, when this situation arises, the user will just re-enter their access code when the system is not disarmed, or when they receive an error message. In contrast to prior art systems which in these circumstances would not enable the user to enter the correct access code, as the keystroke entry would be shifted by one digit one way or the other, the security system of the present invention, by looking for the presence of the correct valid access code anywhere within the sequence of key-presses recognizes the entry of a valid code in these situations. Thus, the security system of the present invention reduces the possibility of false alarms as a result of incorrect entry of a valid access code by an authorized user.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A security system comprising a control panel for controlling the operation of the security system and a keypad for communication with the control panel by entry of access codes by key-presses of keys on the keypad of the keypad controller, the control panel including a means for examining a sequence of key-presses for a match between a first defined number of consecutive key-presses and access codes programmed in the control panel, the control panel examining the sequence of key-presses after a second defined number of key-presses and if no match is found, continuing to examine the most recent first defined number of key-presses after each further individual key-press until a match is found.

2. A security system as in claim 1 wherein the means for examining the sequence of key-presses includes a key-press buffer for storing the most recent first defined number of key-presses, the control panel comparing the key-presses stored in the key-press buffer with digits programmed in the control panel.

3. A security systems as in claim 2 wherein the means for examining the sequence of key-presses further includes a means for counting the number of key-presses to determine when a defined number of total key-presses have been examined.

4. A security system as in claim 3 wherein the second defined number of key-presses is equal to the first defined number of key-presses.

5. A security system as in claim 4 wherein the first defined number of key-presses is a number between 2 and 6.

6. A security system as in claim 5 wherein the first defined number of key-presses is 4 or 6.

7. A security system as in claim 6 wherein the first defined number of key-presses is 4.

8. A security system as in claim 6 wherein the defined number of total key-presses is a number between 12 and 24.

9. A security system as in claim 7 wherein the defined number of total key-presses is 12 or 16.

10. A method for examining a sequence of key-presses from a keypad of a security system to match a first defined member of consecutive key-presses with access codes programmed in a control panel of the security system, the method comprising:

waiting for a second defined number of key-presses to be entered;

examining the initial first defined number of consecutive key-presses for a match with an access code;

if no match is found and a new key-press is entered, examining the most recent first defined number of consecutive key-presses for a match;

continuing to examine the most recent first defined number of consecutive keystrokes for a match after every new key-press until a match has been identified.

11. A method as in claim 10 wherein the system stores the most recent first defined number of key-presses in a key-press buffer, the control panel comparing the key-presses stored in the key-press buffer with digits programmed in the control panel.

12. A method as in claim 11 wherein the system counts the number of key-presses to determine when a defined number of total key-presses have been examined.

13. A method as in claim 12 wherein the second defined number of key-presses is equal to the first defined number of key-presses.

14. A method as in claim 13 wherein the first defined number of key-presses is a number between 2 and 6.

15. A method as in claim 14 wherein the first defined number of key-presses is 4 or 6.

16. A method as in claim 15 wherein the first defined number of key-presses is 4.

17. A method as in claim 15 wherein the defined number of total key-presses is a number between 12 and 24.

18. A method as in claim 16 wherein the defined number of total key-presses is 12 or 16.

* * * * *